US012574929B2

(12) United States Patent
Marinier et al.

(10) Patent No.: US 12,574,929 B2
(45) Date of Patent: Mar. 10, 2026

(54) PHYSICAL UPLINK CONTROL CHANNEL TRANSMISSION

(71) Applicant: InterDigital Patent Holdings, Inc., Wilmington, DE (US)

(72) Inventors: Paul Marinier, Brossard (CA); Moon-il Lee, Melville, NY (US); Fumihiro Hasegawa, Westmount (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 428 days.

(21) Appl. No.: 18/019,727

(22) PCT Filed: Aug. 5, 2021

(86) PCT No.: PCT/US2021/044687
§ 371 (c)(1),
(2) Date: Feb. 3, 2023

(87) PCT Pub. No.: WO2022/031934
PCT Pub. Date: Feb. 10, 2022

(65) Prior Publication Data
US 2024/0023103 A1      Jan. 18, 2024

Related U.S. Application Data

(60) Provisional application No. 63/091,554, filed on Oct. 14, 2020, provisional application No. 63/061,621, filed on Aug. 5, 2020.

(51) Int. Cl.
*H04W 72/21* (2023.01)
*H04W 72/25* (2023.01)
(Continued)

(52) U.S. Cl.
CPC ........... *H04W 72/21* (2023.01); *H04W 72/25* (2023.01); *H04W 72/27* (2023.01); *H04W 72/29* (2023.01)

(58) Field of Classification Search
CPC ..... H04W 72/20; H04W 72/21; H04W 72/25; H04W 72/27; H04W 72/29
See application file for complete search history.

(56) References Cited

U.S. PATENT DOCUMENTS

| 2005/0031054 A1* | 2/2005 | Horisaki | ............... | H04B 7/0851 |
| | | | | 375/341 |
| 2012/0113831 A1* | 5/2012 | Pelletier | ................ | H04L 5/0053 |
| | | | | 370/252 |

(Continued)

FOREIGN PATENT DOCUMENTS

EP            3471321 A1      4/2019

OTHER PUBLICATIONS

3rd Generation Partnership Project (3GPP), R1-1711098, "Sequence-based PUCCH for UCI of up to 2 bits", Ntt Docomo, Inc., 3GPP TSG RAN WG1 NR Ad-Hoc#2, Qingdao, P.R. China, Jun. 27-30, 2017, 14 pages.

(Continued)

*Primary Examiner* — Jeong S Park
(74) *Attorney, Agent, or Firm* — Condo Roccia Koptiw LLP

(57) ABSTRACT

Systems, methods, and instrumentalities are described herein for physical uplink control channel (PUCCH) transmissions. A WTRU may transmit uplink control information (UCI), for example, by encoding the UCI, distributing the coded bits to at least one symbol set, and transmitting at least one sequence over resources of at least one symbol set. A sequence for a (e.g., each) symbol set may be selected from a set of candidate sequences. The number of symbol sets and/or candidate sequences may depend on the number of coded bits assigned to the symbol set. A WTRU may determine a parameter of a transmission (e.g., a number of symbol sets), for example, based on an estimation of Doppler. Transmission may be performed in multiple resource (Continued)

blocks (RBs). Hopping of base sequence and/or cyclic shift may be used, for example, for interference randomization. Unequal error protection may be used for different types of UCI.

18 Claims, 5 Drawing Sheets

(51) Int. Cl.
 *H04W 72/27* (2023.01)
 *H04W 72/29* (2023.01)

(56) References Cited

U.S. PATENT DOCUMENTS

| | | | | |
|---|---|---|---|---|
| 2013/0083867 | A1* | 4/2013 | Frenne | H04L 1/0031 375/295 |
| 2018/0092156 | A1* | 3/2018 | Kim | H04W 12/03 |
| 2018/0198569 | A1* | 7/2018 | Lyu | H04W 72/21 |
| 2018/0324787 | A1* | 11/2018 | Yin | H04L 5/0053 |
| 2019/0097779 | A1* | 3/2019 | Wu | H04L 1/1858 |
| 2020/0281011 | A1* | 9/2020 | Xiong | H04W 72/20 |
| 2021/0160855 | A1* | 5/2021 | Gao | H04L 1/1858 |

OTHER PUBLICATIONS

3rd Generation Partnership Project (3GPP), R1-2004499, "Potential Techniques for Coverage Enhancements", Qualcomm Incorporated, 3GPP TSG-RAN WG1 Meeting #101 e-Meeting, May 25-Jun. 5, 2020, 15 pages.

3rd Generation Partnership Project (3GPP), R1-2106120, "Design of Rel-17 intra-UE multiplexing/prioritization", Apple Inc., 3GPP TSG-RAN WG1 Meeting #105-e, e-Meeting, May 10-27, 2021, 47 pages.

3rd Generation Partnership Project (3GPP), RP-193240, "New SIDS on NR Coverage Enhancement", China Telecom, 3GPP TSG RAN Meeting #86, Sitges, Spain, Dec. 9-12, 2019, 4 Pages.

3rd Generation Partnership Project (3GPP), TS 38.211 V16.1.0, "Technical Specification Group Radio Access Network, NR, Physical channels and Modulation (Release 16)", Mar. 2020, pp. 1-130.

* cited by examiner

PHYSICAL UPLINK CONTROL CHANNEL TRANSMISSION

CROSS-REFERENCE TO RELATED APPLICATIONS

This application is the National Stage Entry under 35 U.S.C. § 371 of Patent Cooperation Treaty Application No. PCT/US2021/044687, filed Aug. 5, 2021, which claims the benefit of Provisional U.S. Patent Application No. 63/061, 621, filed Aug. 5, 2020, and Provisional U.S. Patent Application No. 63/091,554, filed Oct. 14, 2020, the disclosure of which are incorporated herein by reference in their entireties.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and devices are described herein to transmit sequences (e.g., modulation sequences) in an uplink transmission. In an example, a device may receive an indication of symbols for an uplink transmission. Uplink control information (UCI) may be transmitted via the uplink transmission. The device may determine the UCI. The device may determine encoded UCI bits based on the UCI. The encoded UCI bits may include a first subset of the encoded UCI bits and a second subset of the encoded UCI bits. For example, the device may separate the encoded UCI bits into different subsets including the first subset of the encoded UCI bits and the second subset of the encoded UCI bits. The device may determine a first modulation sequence for a first portion of the symbols based on the first subset of the encoded UCI bits and determine a second modulation sequence for a second portion of the symbols based on the second subset of the encoded UCI bits. The device may transmit, in the uplink transmission, the first modulation sequence using the first portion of the symbols. The device may transmit, in the uplink transmission, the second modulation sequence using the second portion of the symbols. The device may determine the first portion of the plurality of symbols and the second portion of the plurality of symbols based on configuration information. The device may receive the configuration, for example, via radio resource control (RRC) message(s).

The first portion of the symbols may be a first subset of the symbols. The second portion of the symbols may be a second subset of the symbols. The first subset of the symbols and the second subset of the symbols may be different. For example, the first subset of the symbols may include a first symbol associated with the uplink transmission. The second subset of the symbols may include a second symbol associated with the uplink transmission. The first symbol and the second symbol may be different.

The first modulation sequence and the second modulation sequence may be different or the same. In some examples, the first modulation sequence and the second modulation sequence may be different. In some examples, the first modulation sequence may be the same as the second modulation sequence.

The first modulation sequence and the second modulation sequence may be selected from the same set of candidate sequences or from different sets of candidate sequences. In an example, the first modulation sequence may be selected from a first set of candidate sequences. The second modulation sequence may be selected from a second set of candidate sequences. The first set of candidate sequences and the second set of candidate sequences may be different. In some examples, the first set of candidate sequences may be the same as the second set of candidate sequences.

The first modulation sequence and the second modulation sequence may be generated. For example, the device may receive configuration information for the first modulation sequence and the second modulation sequence. The device may generate the first modulation sequence and the second modulation sequence based on the configuration information.

DETAILED DESCRIPTION

Figure 1A:
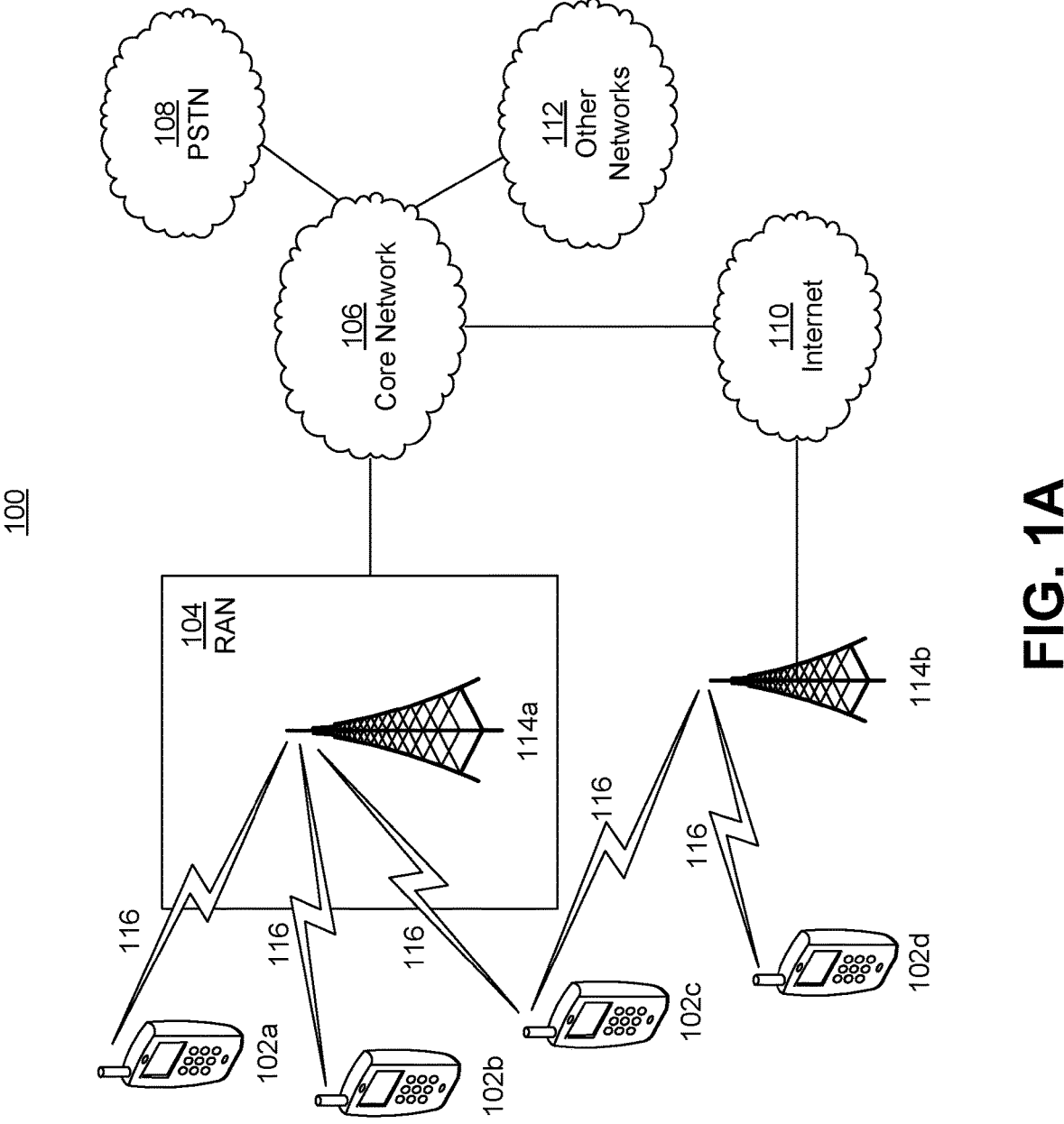
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
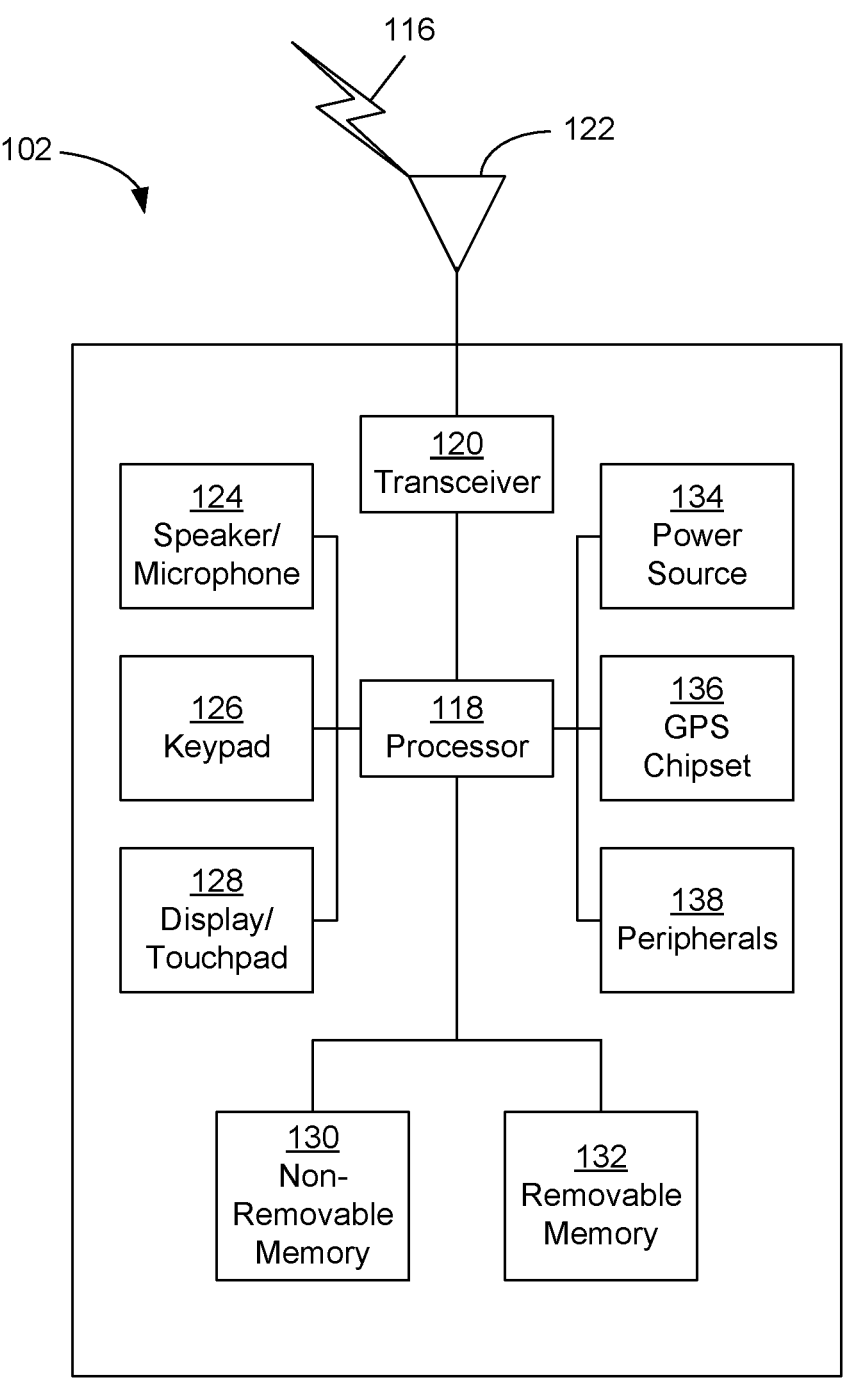
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
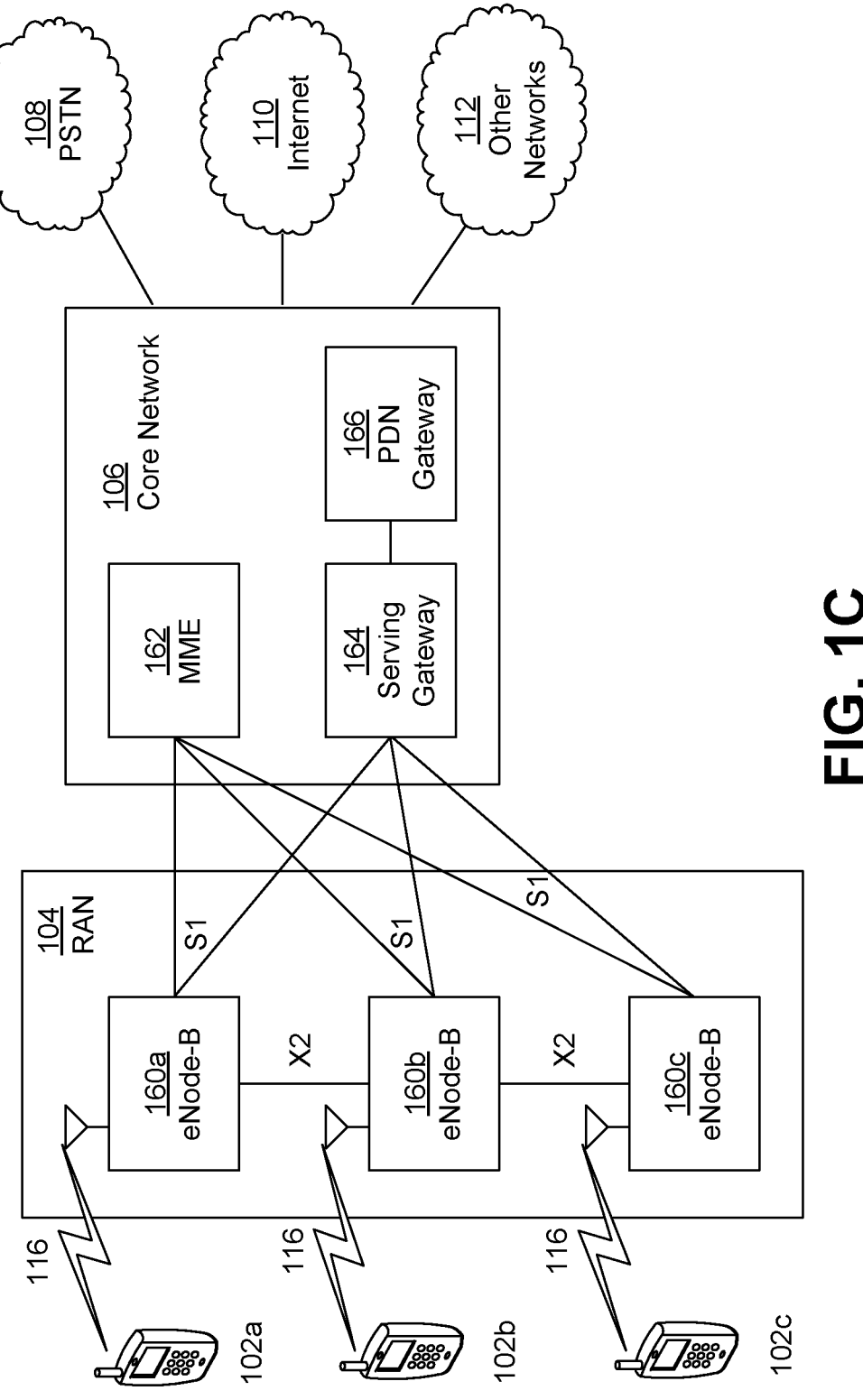
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
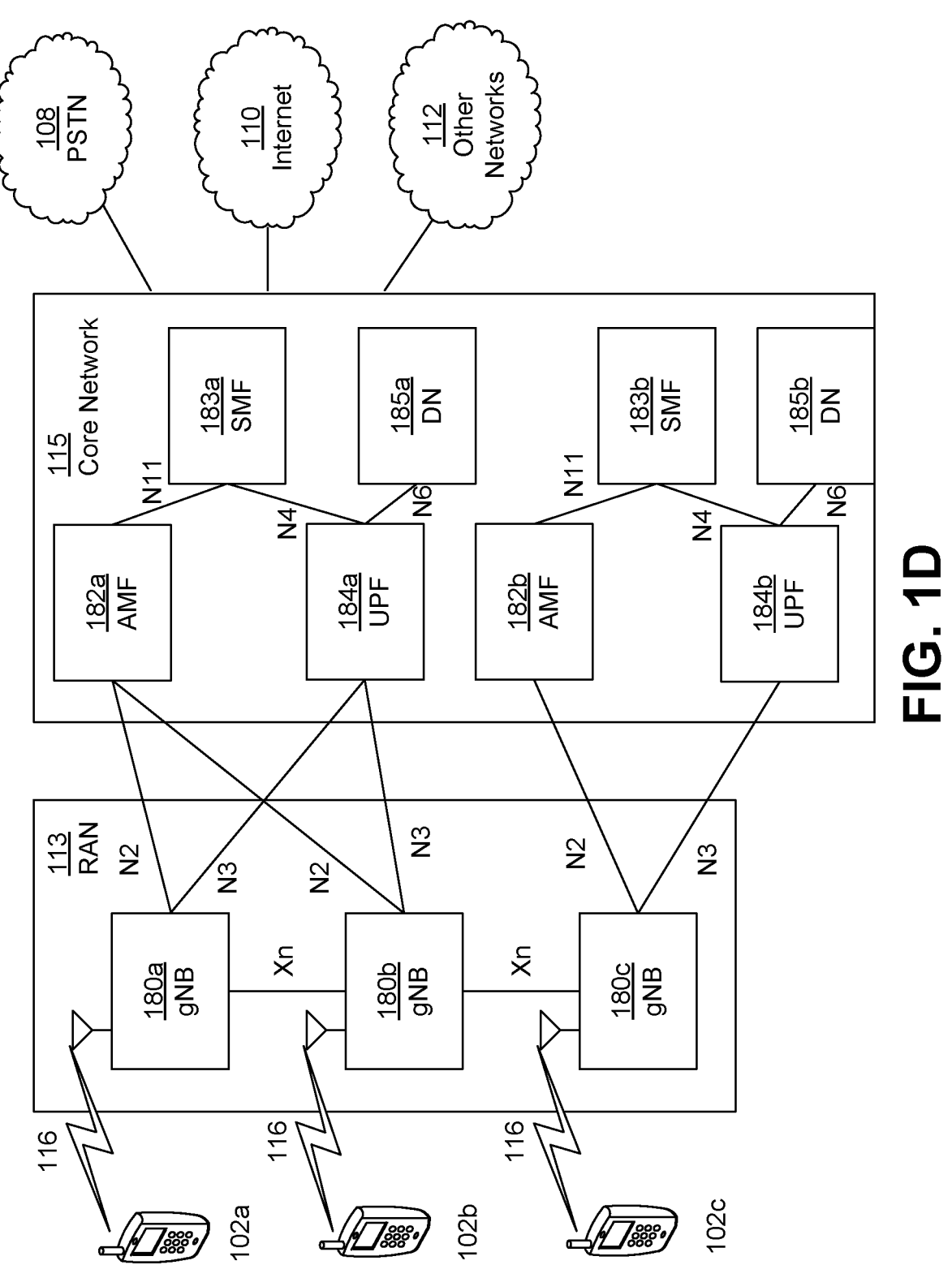
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and devices are described herein to transmit sequences (e.g., modulation sequences) in an uplink transmission. In an example, a device may receive an indication of symbols for an uplink transmission. Uplink control information (UCI) may be transmitted via the uplink transmission. The device may determine the UCI. The device may determine encoded UCI bits based on the UCI. The encoded UCI bits may include a first subset of the encoded UCI bits and a second subset of the encoded UCI bits. For example, the device may separate the encoded UCI bits into different subsets including the first subset of the encoded UCI bits and the second subset of the encoded UCI bits. The device may determine a first modulation sequence for a first portion of the symbols based on the first subset of the encoded UCI bits and determine a second modulation sequence for a second portion of the symbols based on the second subset of the encoded UCI bits. The device may transmit, in the uplink transmission, the first modulation sequence using the first portion of the symbols. The device may transmit, in the uplink transmission, the second modulation sequence using the second portion of the symbols. The device may determine the first portion of the plurality of symbols and the second portion of the plurality of symbols based on configuration information. The device may receive the configuration, for example, via radio resource control (RRC) message(s).

The first portion of the symbols may be a first subset of the symbols. The second portion of the symbols may be a second subset of the symbols. The first subset of the symbols and the second subset of the symbols may be different. For example, the first subset of the symbols may include a first symbol associated with the uplink transmission. The second subset of the symbols may include a second symbol associated with the uplink transmission. The first symbol and the second symbol may be different.

The first modulation sequence and the second modulation sequence may be different or the same. In some examples, the first modulation sequence and the second modulation sequence may be different. In some examples, the first modulation sequence may be the same as the second modulation sequence.

The first modulation sequence and the second modulation sequence may be selected from the same set of candidate sequences or from different sets of candidate sequences. In an example, the first modulation sequence may be selected from a first set of candidate sequences. The second modulation sequence may be selected from a second set of candidate sequences. The first set of candidate sequences and the second set of candidate sequences may be different. In some examples, the first set of candidate sequences may be the same as the second set of candidate sequences.

The first modulation sequence and the second modulation sequence may be generated. For example, the device may receive configuration information for the first modulation sequence and the second modulation sequence. The device may generate the first modulation sequence and the second modulation sequence based on the configuration information.

Systems, methods, and instrumentalities are described herein that are associated with physical uplink control channel (PUCCH) transmissions. A wireless transmit/receive unit (WTRU) may transmit uplink control information (UCI), for example, by encoding the UCI, distributing the coded bits to at least one symbol set, and transmitting at least one sequence over resources of at least one symbol set. A sequence for a symbol set (e.g., each symbol set) may be selected from a set of candidate sequences.

The number of symbol sets and/or candidate sequences may depend on the number of coded bits assigned to the symbol set. A WTRU may determine a parameter of a transmission (e.g., a number of symbol sets), for example, based on a Doppler estimation. Transmission may be performed in multiple resource blocks (RBs), for example, to increase frequency diversity. Hopping of a base sequence and/or a cyclic shift may be used, for example, for interference randomization. Unequal error protection may be used for different types of UCI.

A WTRU (e.g., such as a 5G NR WTRU or other WTRU) may transmit uplink control information (UCI) over a physical uplink control channel (PUCCH). Multiple transmission formats for PUCCH may be provided. For example, the PUCCH formats may be distinguished based on the number of orthogonal frequency modulation (OFDM) symbols (e.g., length in OFDM symbols) and/or payload size (e.g., in number of bits), as illustrated by example in Table 1.

TABLE 1

| Example of PUCCH transmission formats | | |
| --- | --- | --- |
| PUCCH format | Length in OFDM symbols $N_{symb}{}^{PUCCH}$ | Number of bits |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH formats 1, 2, 3 and 4 may include transmission of a demodulation reference signal (DM-RS), for example, to support coherent demodulation at a receiver. A PUCCH format 0 transmission scheme may include a sequence that may be detected non-coherently at a receiver. A transmission scheme with a sequence may be referred to as a sequence-based transmission. The maximum payload size for a sequenced-based PUCCH transmission (e.g., a PUCCH format 0 transmission) may be two (2) bits.

Sequence-based PUCCH transmission may be supported, for example, for up to two (2) bits payload and for more than one symbol. Sequence hopping may be used, for example, if multiple symbols (e.g., different symbols) are transmitted. The sequences for a first symbol and a second symbol may be different.

Coverage enhancement (CE) system information (SI) may improve performance (e.g., in coverage limited scenarios). Coverage enhancements (e.g., for NR) may support a sequence-based PUCCH transmission scheme for payloads larger than 2 bits. Non-coherent detection may perform better in low signal-to-noise ratio (SNR) conditions (e.g., in coverage-limited scenarios). In an example, gains of the order of 3 dB may be achieved/expected for a payload of 11 bits and 11 Hz Doppler, for a range between 4 and 14 symbols.

Performance gains shown for sequence-based PUCCH may be observed under a relatively low Doppler regime, for which the channel may be relatively constant for the (e.g., all) time symbols of the slot. Coverage may be maximized, for example, by transmitting PUCCH over most or all symbols of the slot (e.g., 14 symbols). A channel may vary (e.g., under a high Doppler regime) between different symbols of a slot, which may degrade the performance of a sequence-based transmission. Robust sequence-based PUCCH transmission under a high Doppler regime may be supported, e.g., via one or more features described herein. Adaptation to varying Doppler conditions may be supported (e.g., enabled).

A transmission scheme may be robust to channel variations within a slot. In an example transmission scheme, a WTRU may perform one or more of the following. The WTRU may encode an uplink control information (UCI) payload using a code (e.g., a Reed-Muller (RM) code or a polar code) to obtain C coded bits. The WTRU may distribute the C encoded bits among a set of S symbol sets (e.g., distinct symbol sets). The WTRU may determine a set of $2^{Cs}$ ($2^{Cs}$) candidate sequences for a symbol set (e.g., each of the symbol sets). C may be used to represent the total number of coded bits. Cs may be used to represent the number of coded bits assigned to symbol set s. For example, C may be 28 bits and Cs may be 4 bits. The WTRU may map (e.g., for each of the symbol sets) the Cs encoded bits to a sequence out of the set of $2^{Cs}$ candidate sequences and transmit the sequence over the resources of the symbol set. An example of the transmission scheme is shown in FIG. 2.

Figure 2:
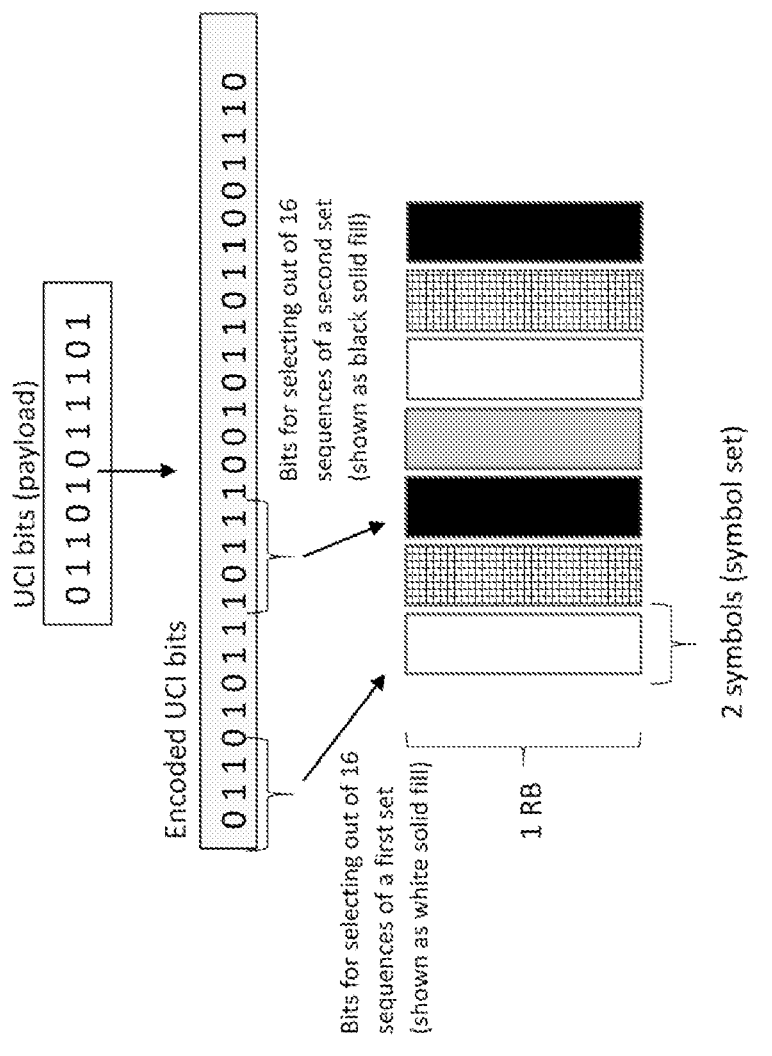
FIG. 2 illustrates an example of a transmission scheme that may be robust to channel variations within a slot.

FIG. 2 illustrates and example of a transmission scheme that may be robust to channel variations within a slot. The transmission scheme may avoid degradation of sequence-based detection (e.g., due to channel variations), for example, since the mapping of a sequence (e.g., each sequence) may be over resources within which the channel has little variation. The transmission scheme may be robust to deep fades or interference bursts that may occur (e.g., in specific symbol sets), for example, since the fades or bursts may affect a small number of encoded bits. A symbol set may be 2 symbols (e.g., where in FIG. 2 an example may be the 4 bits in the first bracket, 0110, comprise 2 symbols). A resource block may include a set of 12 subcarriers. In examples, such as examples associated with FIG. 2, a WTRU may use a first subset of encoded UCI bits (e.g., 0110 as illustrated in the first bracketed bits in FIG. 2) to select a first sequence out of 16 sequences in a first set of sequences (e.g., the $1^{st}$ white solid filled vertical box ($1^{st}$ box) shown in FIG. 2 represents/comprises the first set of 16 sequences). A WTRU may use a second set of encoded UCI bits (e.g., 1011 as illustrated in the second bracketed bits in FIG. 2) to select a second sequence out of 16 sequences in a second set sequences (e.g., the first black solid filled vertical box ($3^{rd}$ box) shown in FIG. 2 represents/comprises the second set of 16 sequences). The WTRU may transmit the first sequence over resources associated with the first symbol set and transmit the second sequence over resources associated with the second symbol set.

A WTRU may determine parameters to adapt to varying Doppler conditions. A WTRU may derive a set of S symbol sets (e.g., distinct symbol sets) from a sub-length parameter Ls, which may be obtained, for example, from a combination of higher layer signaling and physical layer signaling. There may be flexibility for setting the Ls parameter. A larger sub-length may perform better in some conditions (e.g., under low Doppler conditions) while a smaller sub-length may perform better in other conditions (e.g., under high Doppler conditions).

A WTRU may obtain an Ls parameter, for example, from a format-specific or a resource-specific PUCCH configuration, or from medium access control (MAC) signaling. The Ls parameter may allow adaptation by a network.

A WTRU may determine an Ls parameter, for example, based on an estimation of Doppler spread from configured measurement resources, which may be useful, for example, if there is no dynamic indication associated with a PUCCH, for example, for reporting periodic channel state information (CSI). Doppler spread may be a characteristics of a wireless propagation channel.

PUCCH transmission resources may include symbol sets. The resources of a PUCCH transmission may include a number of symbol sets (e.g., S sets). A symbol set (e.g., each symbol set) of the symbol sets may include, for example, at least one symbol in the time domain and one or more resource blocks (RBs) in the frequency domain. A symbol set may include, for example, a combination of time symbols and resource blocks. Time symbols may or may not be contiguous.

Frequency allocation may be different among different symbol sets (e.g., between a first symbol set and a second symbol set), for example, to increase (e.g., maximize) frequency diversity. Frequency allocation may be different among different time symbols (e.g., between a first time symbol and a second time symbol), for example, to increase (e.g., maximize) frequency diversity. Resource block(s) may be allocated based on (e.g., as a function of) a symbol set index, for example, according to a fixed or pseudo-random pattern. Different sets of resource blocks may be used for different parts of symbol set(s). In examples, a first set of resource blocks may be used for a first half of symbol set(s), and/or a second set of resource blocks may be used for a second half of symbol set(s).

A WTRU may determine at least one parameter from a configuration (e.g., an explicit configuration), for example, from signaling (e.g., higher layer signaling) associated with a PUCCH resource or format. One or more parameters may be derived (e.g., implicitly derived) from other parameters. Parameters may include, for example, one or more of the following: a number (S) of symbol sets; a total number of symbols for the PUCCH resource; a set of time symbols, a set of resource blocks, a set of combinations of symbols and resource blocks (e.g., including size thereof) for a (e.g., each) symbol set; a time interval between symbols of a symbol set for a (e.g., each) symbol set; a starting symbol of the symbol set in a slot for a (e.g., each) symbol set; a number of resource elements for a (e.g., each) symbol set; a symbol set index for a (e.g., each) symbol set within a PUCCH; and/or the like. In some examples, at least one of the parameters may be selected based on the payload size.

A configuration of symbol sets may be determined based on (e.g., obtained from) a number S of symbol sets, for example, using one or more of the following:

For a certain number of symbol sets (e.g., S=14), a symbol set (e.g., each symbol set) may include a time symbol (e.g., a single time symbol) of a slot;

For a certain number of symbol sets (e.g., S=7), the $s^{th}$ symbol set may include (e.g., only include) time symbols $2(s-1)$ and $2(s-1)+1$ or alternatively, time symbols $2(s-1)$ and $2(s-1)+7$;

For a certain number of symbol sets (e.g., S=4), a first symbol set may include (e.g., only include) a first set of time symbols (e.g., time symbols $\{0,1,2\}$), a second symbol set may include (e.g., only include) a second set of time symbols (e.g., time symbols $\{3,4,5,6\}$), a third symbol set may include (e.g., only include) a third set of time symbols (e.g., time symbols $\{7,8,9\}$) and a fourth symbol set may include a fourth set of time symbols (e.g., time symbols $\{10,11,12,13\}$);

For a certain number of symbol sets (e.g., S=2), a first symbol set may include (e.g., only include) a first set of time symbols (e.g., time symbols $\{0,1,2,3,4,5,6\}$), and a second symbol set may include (e.g., only include) a second set of time symbols (e.g., time symbols $\{7,8,9, 10,11,12,13\}$). For a certain number of symbol sets (e.g., S=2), a first and second symbol sets may include (e.g., only include) odd and even time symbols, respectively.

Resources may be mapped from sequences of symbols. A WTRU may generate a sequence of modulated symbols for a symbol set (e.g., each symbol set). A WTRU may map the modulated symbols to a resource of the symbol set, for example, according to a mapping rule. For example, a mapping rule may map symbols by order of increasing frequency (e.g., sub-carriers) first, and by order of increasing time second, or vice versa.

A WTRU may perform sequence generation. A WTRU may (e.g., for each symbol set) select a sequence out of a set of Ts candidate sequences (e.g., a pseudo-random sequence, such as Gold code, Zadoff-Chu, m-sequence, and so on)

based on a subset of coded bits. A sequence (e.g., each sequence) of a set may be characterized, for example, by at least one of: a seed for initialization; a cyclic shift value; a base sequence index; a length; an orthogonal cover code index; and/or the like.

A set of Ts candidate sequences may be different between symbol sets. One or more sequences (e.g., all sequences) within a set of candidate sequences may be generated from a common property or parameter. A WTRU may determine a parameter, for example, as a function of the symbol set index, using a formula, or from configuration information (e.g., where the configuration information may be received via higher layer signaling and the higher layer signaling indicates (e.g., explicitly indicates) the parameter).

In examples, a set of Ts candidate sequences may be referred to as $\bar{r}_{u,v}(\alpha)$ or $\bar{r}_{u,v}(\alpha, w)$, e.g., with code group u, base sequence v, cyclic shift value of $\alpha$, and orthogonal cover code index w. A set of Ts candidate sequences may be a set of cyclic shift values (e.g., $\alpha \in \{0, 4, 8, 12\}$), for example, with the same code group u, and base sequence v. One or more of following may apply. A set of cyclic shift values may be determined, for example, based on symbol set index (e.g., or a time location of the symbol set in a slot). For example, a first set of cyclic shift values (e.g., $\alpha \in \{0, 3, 6, 9\}$) may be used or determined for a first symbol set index and a second set of cyclic shift values (e.g., $\alpha \in \{1, 4, 7, 10\}$) may be determined for a second symbol set index, and so on. The number of cyclic shift values in a set of cyclic shift values may be determined, for example, based on a symbol set index (or time location of the symbol set in a slot). A first set of cyclic shift values (e.g., $\alpha \in \{0, 6\}$) may include, for example, two cyclic shift values in the set used for a first symbol set index. A second set of cyclic shift values (e.g., $\alpha \in \{1, 4, 7, 10\}$) may include, for example, four cyclic shift values in the set used for a second symbol set index.

A set of Ts candidate sequences may be a set of orthogonal cover code (OCC) indices, for example, with the same code group, base sequence, and/or cyclic shift values. A set of Ts candidate sequences may be a combination of cyclic shift values and OCC indices. For example, Ts=4 candidate sequences in a set may include $\{(\alpha=0, w=[1\ 1]), (\alpha=0, w=[1\ -1]), (\alpha=6, w=[1\ 1]), (\alpha=6, w=[1\ -1])\}$. Ts may be determined, for example, based on symbol set index. The combination set may be determined, for example, based on a symbol set index.

Sequence hopping may be used, for example, to randomize interference.

One or more sequences (e.g., a set of candidate sequences) may have (for example, be characterized by) a property. One or more properties of a set of candidate sequences may be based on (e.g., is a function of) one or more of the following: a slot number, a symbol number and/or a symbol set index. The properties may include one or more of the following: a code group or sequence group u; a base sequence number v; and/or a cyclic shift value $\alpha$.

Hopping may have the benefit of randomizing interference. A hopping function may be obtained (e.g., derived), for example, from a pseudo-random sequence. Such sequence (s) for hopping may be initialized, for example, at the beginning of a radio frame and/or be function of: a cell identity and/or an identity configured by higher layers.

Modulation may be used for a sequence(s).

A sequence may be mapped to modulation symbols, for example, by combining bits depending on the modulation order. In examples (e.g., for quadrature phase shift keying (QPSK)), multiple bits (e.g., every two bits) may be mapped to a modulation symbol. A WTRU may truncate the length of a sequence, for example, to match the number of available modulation symbols in the symbol set.

In examples, a symbol set may be split into different subsets. A WTRU may determine a different set of candidate sequences for the different subsets. The WTRU may select the sequence for subsets (e.g., all subsets), for example, based on the same set of coded bits associated to the symbol set. For example, a subset may include a specific time symbol for a symbol set of more than one symbol, or a specific combination of time symbol and resource block for a symbol set of more than one resource block.

The number of subsets and the parameters associated with the sequences (e.g., as described herein) may depend on at least one resource-related property (e.g., as described herein), such as one or more of a number of time symbols, a number of resource blocks for a symbol set (e.g., each symbol set), a number of symbol sets, etc.

In some examples, a set of resource blocks (RBs) may be used for a PUCCH transmission, where one or more subsets of RBs may be determined, used, and configured. A subset of RBs (e.g., each subset of RBs) may be associated with or may include one or more symbol sets.

A WTRU may perform payload encoding. A WTRU may transmit PUCCH for a payload of P information bits. The P information bits may include at least uplink control information (UCI) comprising at least one of the following: a hybrid automatic request (HARQ) feedback (e.g., HARQ acknowledgement (HARQ-ACK)), channel state information (CSI), a scheduling request (SR), a link recovery request (LRR), or a configured grant UCI (CG-UCI).

A WTRU may determine at least one parameter, for example, from configuration information (e.g., an explicit configuration information) from signaling, such as higher layer signaling associated with the PUCCH resource or format. One or more parameters may be derived (e.g., implicitly derived) from other parameters. One or more parameters may be pre-defined. Parameter(s) may include, for example, at least one of the following: a total number of coded bits C (e.g., dependent on the payload size); a number of coded bits per sequence Cs; a type of coding (e.g., block coding, such as Reed-Solomon (RS), repetition, polar code, convolutional); a coding rate or target coding rate; a number of candidate sequences for a symbol set (e.g., each symbol set); a number of coded bits to map to a candidate sequence; the number S of symbol sets; and/or the like.

In examples, a WTRU may determine the number of coded bits as a function of the payload and the number of symbol sets S.

In examples, a determination of whether to use channel coding may be based on payload size. A determination may be based on a threshold. Channel coding may not be used, and the payload may be mapped to one or more modulation symbols and allocated to one or more symbol sets, for example, if the payload of the PUCCH is less than a threshold. Channel coding may be used, for example, otherwise (e.g., if the payload of the PUCCH is greater than or equal to the threshold). Uncoded bits may be used for a PUCCH transmission, for example, if the payload of the PUCCH transmission is less than a threshold; otherwise, coded bits may be used for the PUCCH transmission. A threshold may be predefined, predetermined, or configured, e.g., via a higher layer signaling. A threshold may be determined, for example, based on one or more of the following: a PUCCH format type; a number of symbols for PUCCH; a number of symbol sets; a number of RBs for the PUCCH transmission; a number of sequences used for a sequence set (e.g., Ts); and/or the like.

A device (e.g., a WTRU) may multiplex multiple types of uplink control information (UCI) (e.g., one or more of HARQ-ACK, SR, LRR, CSI, CG-UCI, or the like) in a PUCCH (e.g., in a PUCCH transmission). The device may concatenate the multiple types of UCI and/or encode (e.g., jointly encode) them. In examples, the WTRU may separately encode different types of UCI (e.g., using different coding rates and/or coding types) and/or map the resulting coded bits to multiple symbol sets (e.g., different symbol sets). Such separate encoding may enable robust performance for some types of UCI (e.g., more robust performance for some types of UCI compared to others).

Separate encoding may be implemented, for example, by separating UCI into multiple groups (e.g., a first group and a second group). For example, the first group may comprise a first type of UCI (e.g., a higher priority UCI such as HARQ-ACK or SR or LRR), and the second group may comprise a second type of UCI (e.g., a lower priority UCI such as CSI). If UCI to be multiplexed is associated with multiple priority indices, the UCI associated with a higher priority index(ices) may be included in the first group, and/or the UCI associated with a lower priority index(ices) may be included in the second group. The device may determine a different number of coded bits for different groups of UCI. The device may determine a first number of coded bits for the first group of UCI and a second number of coded bits for the second group of UCI. The determination of the first and second number of coded bits may be based on, for example, one or more of the following: a ratio of coding rates between the first and second groups, the total number of coded bits to be used, the number of information bits for the first group, or the number of information bits for the second group. The coding rate of the second group may be twice the coding rate of the first group. If the first group includes 4 information bits, the second group includes 8 information bits, the total number of coded bits is 28 and the ratio between coding rates is 3/2, then the number of coded bits for the first and second group may be set to 12 and 16 respectively. A maximum coding rate may be set for a group (e.g., the first group). If the resulting coding rate for the first group would be higher than the maximum by distributing coded bits based on a ratio of coding rate, the number of coded bits assigned to the first group may be set such that the coding rate is not higher than the maximum and remaining coded bits may be assigned to the second group. The ratio between coding rates and maximum coding rate may be pre-defined or configured, e.g., by higher layer signaling.

Coded bits of the first and second group may be distributed to symbol sets (e.g., as described above), for example, following separate encoding.

Encoded bits may be distributed over symbol sets (e.g., as described in relation to FIG. 2). A WTRU may distribute the C coded bits into groups of Cs coded bits, e.g., for each symbol set. The number of coded bits per symbol set s (Cs) may be linked, for example, by the number of candidate sequences Ts of the symbol set by $Ts=2^{Cs}$. In an example, Cs may be set to four (4). A WTRU may use coded bits $\{c0, c1, c2, c3\}$, for example, to select a sequence out of 16 candidate sequences for a subset (e.g., each subset) of symbol set 0. The WTRU may use coded bits $\{c4, c5, c6, c7\}$, for example, to select a sequence out of 16 candidate sequences for a subset (e.g., each subset) of symbol set 1, and so on using other coded bits.

A WTRU may map the same coded bits or the same groups of coded bits to more than one symbol set to increase diversity. For example, if the number of coded bits is 16, the number of bits per group Cs is 4 and the number of symbol sets is 8, the WTRU may map a first group of coded bits to symbol sets 0 and 4, a second group of coded bits to symbol sets 1 and 5, and so on. In examples, additional groups of coded bits may be generated by cycling over the set of coded bits such that a group may be formed by last bits of the set of coded bits and first bits of the set of coded bits. For example, in case the number of coded bits would be C=30, the WTRU may create additional group of bits as (c28, c29, c0, c1), (c2, c3, c4, c5) and so on.

An example of PUCCH transmission (e.g., based on the above) may be as follows. A UCI payload ranging from 3 to 11 bits may first be encoded into 28 bits, for example, using a code such as a RM code. The 28 bits may then split into 14 symbol sets. Each symbol set may include a single time symbol within the time slot, and for each time symbol 2 coded bits may be mapped to one of 4 candidate sequences. The set of 4 candidate sequences for the time symbol may be determined by a set of cyclic shift values (e.g., $\alpha\in\{0, 3, 6, 9\}$) of a base sequence (e.g., a Zadoff-Chu base sequence). The mapping may be $\alpha=\alpha0$ for "00", $\alpha=(\alpha0+3)$mod 12 for "01", $\alpha=(\alpha0+6)$mod 12 for "10" and $\alpha=(\alpha0+9)$mod 12 for "11". The value $\alpha0$ may be a function of the slot number and/or the symbol number according to a pseudo-random sequence, may be configured by higher layers or may be a pre-defined value (e.g., pre-defined constant). In case a pseudo-random sequence is defined, a parameter initializing the sequence may be configured by higher layers.

A PUCCH transmission may correspond to a specific or particular PUCCH format. A PUCCH format may be characterized, for example, by a range of payload sizes and characteristics of a resource, such as whether an allocation occupies one resource or more than one resource block, the duration of the resource, and/or the number of symbol sets.

In examples, a WTRU may receive one or more configurations. The WTRU may determine distances between symbols in a symbol set. The configuration(s) may include, for example, distance(s) between symbols in the symbol set. The WTRU may determine the distance between symbols from the preconfigured list of distance(s) between symbols. The distance may depend on, for example, the length of the slot, the number of symbols in PUCCH, and/or type of information included in PUCCH (e.g., CSI reports, ACK/NACK, and/or SR). This approach may support (e.g., enhance) robustness, for example, if the channel varies very slowly and multiple consecutive symbols experience deep fade.

In examples, a bitmap pattern may indicate a location of the symbols in a symbol set in a slot. For example, a bitmap pattern may include 14 bits. Location of the symbols in a symbol set may be indicated in the bitmap pattern, for example, by "1". For example, a bitmap pattern [10000001000000] may indicate that the symbols corresponding to the symbol set are located at the first and eight symbol in a slot.

In some examples, a choice of sequences may depend on the distance between symbols in the set. A WTRU may determine a sequence, for example, depending on the distance between symbols in the symbol set.

A WTRU may receive configuration information with a sequence with a length equivalent to two (2) symbols, for example, if symbols in the set are next to each other. In an example, 14 resource elements may be scheduled for PUCCH transmission in the frequency domain, two (2) symbols may be included in the set, and the length of the sequence may be 28 symbols. A sequence may be designed, for example, to minimize peak-to-average power ratio (PAPR), minimize detection error rate, and/or minimize the peak in the spectrum of the sequence in the frequency domain.

In example, sequences may be repeated for the symbols in the set, for example, if symbols in the set are not located consecutively in the set. In an example, 14 resource elements may be used for a PUCCH transmission in the frequency domain, two (2) symbols may be included in the set, and the length of the sequence may be 14 symbols. A WTRU may receive configuration information to transmit the same sequence twice in a slot at the configured symbols. Repetition in the set may allow a gNB to average the received signal, which may reduce detection error probability. A WTRU may receive the configuration information, for example, via downlink control information (DCI), via at least one MAC-CE, or via at least one radio resource control (RRC) message.

Separation of symbols in a symbol set in the time domain may reduce the probability that multiple symbols (e.g., both symbols) experience deep long fade.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A device comprising:
a processor configured to:
receive an indication of a plurality of symbols associated with an uplink transmission;
determine uplink control information (UCI);
determine encoded UCI bits associated with the UCI, wherein the encoded UCI bits comprise a first subset of encoded UCI bits and a second subset of encoded UCI bits;
determine a plurality of sequences based on the first subset of encoded UCI bits and the second subset of encoded UCI bits, wherein a first sequence of the plurality of sequences is determined based on the first subset of encoded UCI bits and on a distance between a first symbol of the plurality of symbols and a second symbol of the plurality of symbols, and wherein a second sequence of the plurality of sequences is determined based on the second subset of encoded UCI bits; and
transmit the plurality of sequences in the uplink transmission, wherein the first sequence is transmitted using a first portion of the plurality of symbols and the second sequence is transmitted using a second portion of the plurality of symbols.

2. The device of claim 1, wherein the first portion of the plurality of symbols is a first subset of the plurality of symbols, the second portion of the plurality of symbols is a second subset of the plurality of symbols, the first subset of the plurality of symbols comprises a first symbol associated with the uplink transmission, the second subset of the plurality of symbols comprises a second symbol associated with the uplink transmission, and the first symbol and the second symbol are different.

3. The device of claim 1, wherein the first sequence and the second sequence are different.

4. The device of claim 1, wherein the first sequence is a same sequence as the second sequence.

5. The device of claim 1, wherein the first sequence is selected from a first set of candidate sequences, and the second sequence is selected from a second set of candidate sequences.

6. The device of claim 5, wherein the first set of candidate sequences and the second set of candidate sequences are different.

7. The device of claim 5, wherein the first set of candidate sequences is a same set of candidate sequences as the second set of candidate sequences.

8. The device of claim 1, wherein the processor is further configured to:
receive configuration information associated with a physical uplink control channel transmission (PUCCH) format; and
determine a length associated with the first sequence based on the configuration information.

9. The device of claim 1, wherein the processor is further configured to:
receive configuration information; and
generate the first sequence and the second sequence based on the configuration information.

10. The device of claim 1, wherein the processor is further configured to:
receive configuration information; and
determine the first portion of the plurality of symbols and the second portion of the plurality of symbols based on the configuration information.

11. The device of claim 1, wherein the device comprises a wireless transmit/receive unit (WTRU), and the first sequence comprises one or more of a seed for initialization, a cyclic shift value, a base sequence index, or an orthogonal cover code index.

12. A method performed by a device, comprising:
receiving an indication of a plurality of symbols associated with an uplink transmission;
determining uplink control information (UCI);
determining encoded UCI bits associated with the UCI, wherein the encoded UCI bits comprise a first subset of encoded UCI bits and a second subset of encoded UCI bits;
determining a plurality of sequences based on the first subset of encoded UCI bits and the second subset of encoded UCI bits, wherein a first sequence of the plurality of sequences is determined based on the first subset of encoded UCI bits and on a distance between a first symbol of the plurality of symbols and a second symbol of the plurality of symbols, and wherein a second sequence of the plurality of sequences is determined based on the second subset of encoded UCI bits; and transmitting the plurality of sequences in the uplink transmission, wherein the first sequence is transmitted using a first portion of the plurality of symbols and the second sequence is transmitted using a second portion of the plurality of symbols.

13. The method of claim 12, wherein the first portion of the plurality of symbols is a first subset of the plurality of symbols, the second portion of the plurality of symbols is a second subset of the plurality of symbols, the first subset of the plurality of symbols comprises a first symbol associated with the uplink transmission, the second subset of the plurality of symbols comprises a second symbol associated with the uplink transmission, and the first symbol and the second symbol are different.

14. The method of claim 12, wherein the first sequence is selected from a first set of candidate sequences, and the second sequence is selected from a second set of candidate sequences.

15. The method of claim 14, wherein the first set of candidate sequences and the second set of candidate sequences are different.

16. The method of claim 12, wherein the first sequence and the second sequence are different.

17. The method of claim 12, further comprising:
receiving configuration information associated with a physical uplink control channel transmission (PUCCH) format; and
determining a length associated with the first sequence based on the configuration information.

18. The method of claim 12, further comprising:
receiving configuration information; and
generating the first sequence and the second sequence based on the configuration information.

* * * * *